DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED DECEMBER 3, 1974

929 O.G. 9

T929,001

STABILIZED ALPHA-ALUMINA MONOHYDRATE EXTRUDATES

William C. Ziegenhain, and Galen K. Madderra, Ponca City, Okla., assignors to Continental Oil Company, Ponca City, Okla.

Filed May 31, 1973, Ser. No. 364,773
**Int. Cl. C01f *7/02***
U.S. Cl. 423—625
No Drawing. 10 Pages Specification

In a method for producing alpha-alumina monohydrate extrudates by admixing acid, water, and alumina to form an extrudable composition, extruding the composition and drying to produce alumina extrudates, the improvement comprising gradually moistening the extrudates, thereby imparting water stability to the extrudates.